Feb. 11, 1930.    J. W. PAGE    1,747,130
EXCAVATING DEVICE
Filed Feb. 26, 1927    2 Sheets-Sheet 1
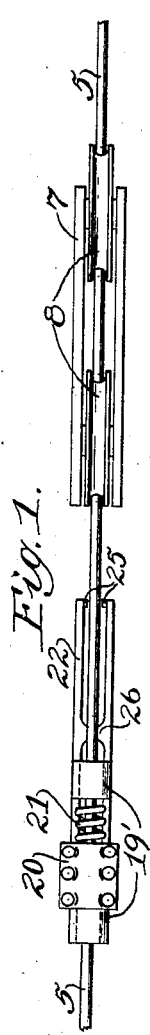
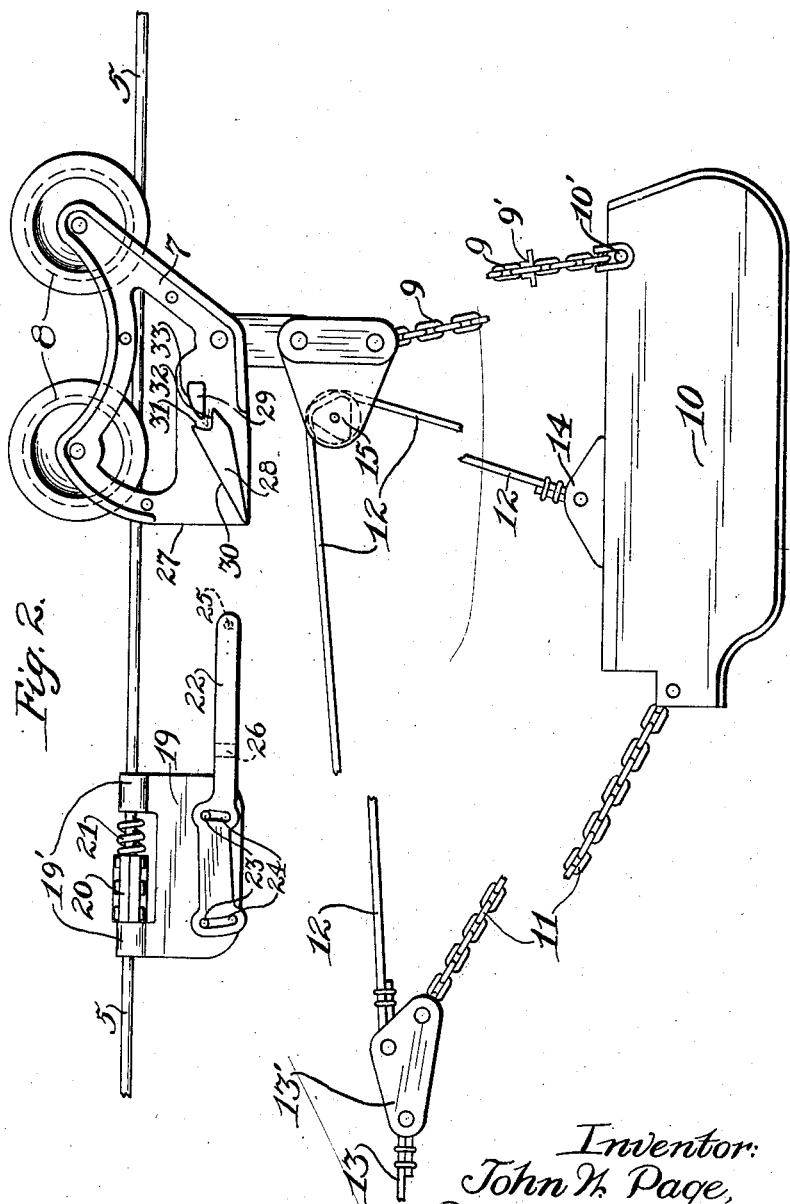
Inventor:
John W. Page,
By Dyrenforth, Lee, Chritton & Niles
Atty's Feb. 11, 1930.

J. W. PAGE 1,747,130

EXCAVATING DEVICE

Filed Feb. 26, 1927

2 Sheets-Sheet 2

Inventor:
John W. Page,
By Dyrenforth, Lee, Chritton & Wiles
Attys.

Patented Feb. 11, 1930

1,747,130

UNITED STATES PATENT OFFICE

JOHN W. PAGE, OF CHICAGO, ILLINOIS

EXCAVATING DEVICE

Application filed February 26, 1927. Serial No. 171,289.

Figure 3:
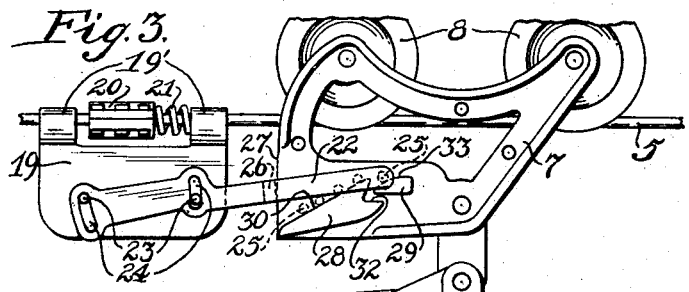
Figure 4:
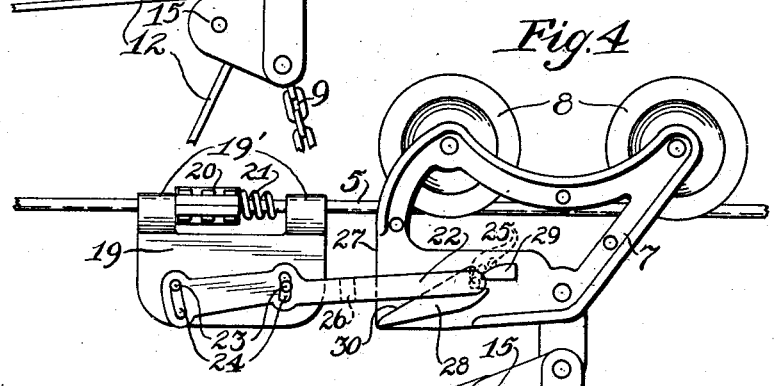
Figure 5:
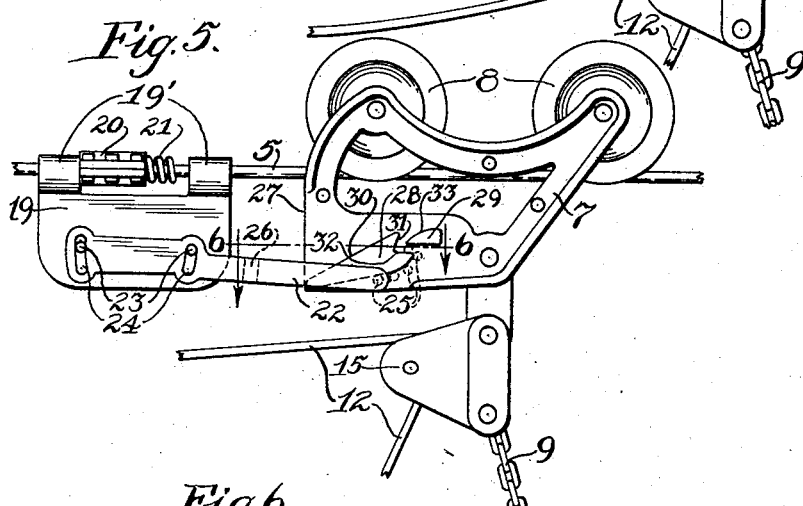
Figure 6:
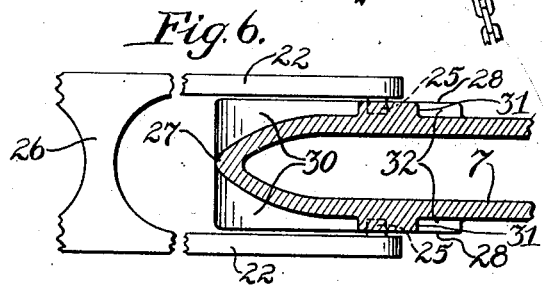

This invention relates to certain new and useful improvements in excavating devices, and is fully described and explained in the specification and shown in the accompanying drawings, in which Fig. 1 is a top plan view showing the carriage and stop on the trolley, Fig. 2 is a similar view in side elevation showing also the bucket, Figs. 3, 4, and 5 are fragmentary views similar to Fig. 2 showing the operation of the latch means in connection with the stop, and Fig. 6 is a view taken as indicated by the line 6 of Fig. 5.

The excavating device herein shown is of the same general type as, and an improvement on, the excavating devices shown in my patents, No. 1,194,777, dated August 15, 1916, and No. 1,506,077, dated August 26, 1924, and its general method of operation is similar. The particular features of difference between this device and those shown in said patents will be particularly pointed out herein.

Referring to the drawings, 5 indicates a cableway provided with the usual means whereby it may be tightened and slackened. This cableway is similar to the one shown in my prior Patent No. 1,194,777 dated August 15, 1916, referred to above. The present device has been found particularly useful in excavating gravel pits and for similar purposes where it is sought to dump the material from many successive bucket-loads in a predetermined position, as in a hopper, (not shown) arranged under the bucket as it dumps. The general arrangement of the trolley with respect to the gravel pit and the location of the hopper are all shown in my prior Patent No. 1,194,777, above referred to, and consequently need not be shown here, since the operation of the device in respect to these features is substantially the same as in said prior patent. The particular construction and operation of the device with respect to its dumping is, however, somewhat different and will be described in detail hereinafter. The inclination of the cableway 5 is such that the bucket will run down by gravity to the point at which it is sought to have it work, and therefore there is required no mechanical means for hauling it in the backward direction in this particular instance.

Mounted upon the cableway 5 is a trolley or carriage which may be of any desirable form, here shown as a substantially triangular frame 7 carrying grooved rollers or wheels 8 running upon the cableway. Attached to the underside of the trolley is a bail 9 to which is swiveled an excavating shovel 10, the centers of the pivots preferably being behind the center of gravity of said shovel. The bail 9 may be of any suitable form and is here shown as formed of two chains separated near their lower ends by means of the spreader bar 9'. It is to be understood that the shovel 10 is pivotally mounted therefor at the points 10', where the ends of the chains 9 are attached to it.

11 indicates the hauling chains, 12 is the holding line, and 13 is the loading line or main hauling line, to which the holding line 12 and the two hauling chains 11 are attached, as is common practice in the Page buckets now used for excavating purposes.

In the device here shown the holding line 12 runs over a block 15 attached to the underside of the trolley 7. The forward end of the holding line 12 is secured to the main hauling line or loading line 13 by means of the connecting piece 13'. From this point it runs upwardly and backwardly over the block 15 and thence is led downwardly to the upper forward part of the bucket, where it is attached at the center as indicated by 14. The block 15 is provided with a sheave having a plurality of flattened faces, here shown as three in number, so that as the holding rope 12 runs over the sheave a leaverage will be established at intervals in favor of the end of said holding rope attached to the hauling means. The construction and operation of the block 15 with such a sheave is fully described and claimed in my co-pending patent application, Serial No. 115,881, filed June 14, 1926, and consequently its construction and operation need not be shown in detail here.

19 indicates a stop on the cableway 5 which is preferably provided with spring means to absorb the jar. As here shown, 20 indicates a member clamped tightly on the cableway and provided with a forwardly projecting spiral spring 21. The stop 19 is supported on the cableway by the two collars 19', 19', one located back of the clamp 20, and the other in front of the spring 21. The stop 19 is therefore permitted to slide a short distance on the cableway 5 against the spring 21 when the trolley engages it and thus the shock is absorbed by means of such spring.

I shall now describe more in detail the latch means in connection with the stop 19. This includes a rockable bifurcated arm 22 carried by the projecting pins 23, 23 embraced by the slots 24, 24 in the arm 22. Reference to Figs. 2 to 5 inclusive will show that this support of the arm on the stop 19 by the pins 23 lying in the slots 24, will permit up and down rocking movement of the forward end of the arm 22. On the inner sides of the front ends of the two prongs of the arm 22 are two inwardly projecting lugs, pins or fingers 25, 25. The two prongs of the arm 22 are joined by a bridging member 26 a short distance in front of the stop 19.

The lower part of the forward edge of the trolley 7 is made in the form of a pilot, or is wedged or pointed, as indicated by 27, and on each side thereof there is provided two cams 28 and 29. The cam 28 has its upper surface inclined upwardly as indicated by 30 and the rear edge of each such cam is provided with a vertical shoulder 31 connecting at its lower edge with the forward edge of a horizontal shelf 32. The cam 29 lies slightly back of the shoulder 31 and slightly above the shelf 32 and has its upper surface inclined forwardly and downwardly as indicated by 33. The pins 25, 25 on the arm 22 are separated enough so that as the trolley engages the latch, these pins will ride up on the cam surfaces 30, 30, one on each side of the pilot edge 27 of the trolley 7.

In the operation of the device, the bucket is drawn forward by the main hauling line or loading line 13 and the tautness maintained on the holding line 12 by the pull on the hauling line 13 is sufficient for preventing the bucket from dumping. The trolley is pulled along until the pilot 27 of the same strikes the bridging member 26 on the latch arm 22, the shock being absorbed by the spring 21. When this has occurred, the pins 25 have ridden up on the slanting surfaces 30 of the cams 28, have passed the rear edges thereof and have fallen on the slanting upper surfaces 33 of the cams 29. The parts are shown in this position in Fig. 3, where the dotted positions of the pins 25 indicate the relative travel of such pins with respect to the slanting top surfaces of the cams 28, just before the trolley strikes the bridging member 26.

When the parts are in the position shown in Fig. 3, the main hauling line or loading line 13 is slackened by the operator, and the trolley 7 then begins to run back by gravity, whereupon the pins 25 fall on the horizontal shelves 32 and thence are pulled up against the vertical shoulders 31 to lock, or latch, the trolley and hold it from running back. Such slackening of the hauling line 13 releases the pull on the holding line 12, which takes away the support of the forward end of the bucket and permits it to dump in the usual manner. It will be seen then that in Fig. 4 the bucket is dumped and held to the stop by means of the latching mechanism. Obviously, this stop is so located on the cableway that the dumping will take place in the desired position.

After the bucket has been dumped, the operator again tightens the hauling line 13 to pull the trolley a slight distance forward, whereupon the pins 25 move backwardly on the horizontal shelves 32 and then fall down below the cams 28, as shown in Fig. 5, where the movement of the fingers relative to the trolley is indicated by the dotted positions. When in this position, the trolley is again released or unlatched from the stop 19, whereupon the operator slacks away on the hauling line 13 to permit the trolley to run back again for another working stroke.

It will be seen that the latching means holds the carriage upon its first engaging the stop, and then releases the same by a pull on the hauling line after said first engagement.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In an apparatus of the character set forth; a main cable; a carriage movable thereon; a scraper bucket pivotally mounted on said carriage in the rear of the center of gravity of the bucket when loaded; a hauling line for pulling the bucket along said main cable; means operated by tension on the hauling line for maintaining the bucket in substantially horizontal position, said means permitting the bucket to swing on its pivot to dumping position upon the hauling line becoming slack; a stop on the main cable lying in the path of said carriage; and latch means adapted to hold said carriage upon its first engaging said stop and release the same by a pull on the hauling line after said first engagement, said latch means comprising a part carried by the stop and a part carried by the carriage, said parts adapted to engage and hold the carriage against return movement upon the carriage first engaging the stop, said parts adapted to be disengaged, and one drop below the other, by another pull on the hauling line after said first engagement of the carriage with said stop.

2. In an apparatus of the character set forth; a main cable; a carriage movable thereon; a scraper bucket pivotally mounted on said carriage in the rear of the center of gravity of the bucket when loaded; a hauling line for pulling the bucket along said main cable; means operated by tension on the hauling line for maintaining the bucket in substantially horizontal position, said means permitting the bucket to swing on its pivot to dumping position upon the hauling line becoming slack; a stop on the main cable lying in the path of said carriage; and means for holding said carriage upon its first engaging said stop and releasing the same upon the hauling line being again pulled after said first engagement, said means comprising cooperating mechanism on the stop and carriage members, including a rockable arm on one of said members having a part on its end adapted to engage with a part on the other member upon the members separating after their first contact, said parts adapted to be released from engagement, and one drop below the other, upon the members being moved together again after said first contact.

3. In an apparatus of the character set forth; a main cable; a carriage movable thereon; a scraper bucket pivotally mounted on said carriage in the rear of the center of gravity of the bucket when loaded; a hauling line for pulling the bucket along said main cable; means operated by tension on the hauling line for maintaining the bucket in substantially horizontal position, said means permitting the bucket to swing on its pivot to dumping position upon the hauling line becoming slack; a stop on the main cable lying in the path of said carriage; and means for holding said carriage upon its first engaging said stop and releasing the same upon the hauling line being again pulled after said first engagement, said means comprising co-operating mechanism on the stop and carriage members, including a rockable arm on one of said members having a part on its end, and a cam surface on the other member, said cam surface being provided with a shoulder, and said part on the rockable arm adapted to engage with said shoulder upon the members separating after first coming into contact and adapted to be released from said shoulder and drop below the same, upon the members being moved together again after said first contact.

4. In an apparatus of the character set forth; a main cable; a carriage movable thereon; a scraper bucket pivotally mounted on said carriage in the rear of the center of gravity of the bucket when loaded; a hauling line for pulling the bucket along said main cable; means operated by tension on the hauling line for maintaining the bucket in substantially horizontal position, said means permitting the bucket to swing on its pivot to dumping position upon the hauling line becoming slack; a stop on the main cable lying in the path of said carriage; and means for holding said carriage upon its first engaging said stop and releasing the same upon the hauling line being again pulled after said first engagement, said means comprising co-operating mechanism on the stop and carriage members, including a rockable arm on one of said members having a part on its end, and a cam surface on the other member having a substantially vertical shoulder bounded on its lower end by a substantially horizontal shelf, the part on the arm adapted to engage with said shoulder and rest upon said shelf upon the member separating after first coming into contact, and said part on said arm adapted to ride away from said shoulder and fall off of said shelf upon the members being moved together again after said first contact.

5. In an apparatus of the character set forth; a main cable; a carriage movable thereon; a scraper bucket pivotally mounted on said carriage in the rear of the center of gravity of the bucket when loaded; a hauling line for pulling the bucket along said main cable; means operated by tension on the hauling line for maintaining the bucket in substantially horizontal position, said means permitting the bucket to swing on its pivot to dumping position upon the hauling line becoming slack; a stop on the main cable lying in the path of said carriage; and means for holding said carriage upon its first engaging said stop and releasing the same upon the hauling line being again pulled after said first engagement, said means comprising co-operating mechanism on the stop and carriage members, including a rockable arm on one of said members having a part on its end, a cam surface on the other member having a shoulder bounded on its lower edge by a substantially horizontal shelf, another cam surface back of said shoulder and above said shelf adapted to direct the part on said arm against said shoulder upon the members separating after first coming into contact, said part on the arm adapted to move away from said shoulder and fall off of said shelf upon the members being again moved together after said first contact.

6. In an apparatus of the character set forth, the combination of: a main cable; a carriage movable thereon; a scraper bucket pivotally mounted on said carriage in the rear of the center of gravity of the bucket when loaded; a hauling line for pulling said bucket along said main cable; a block attached to the carriage, a holding line running from the front of the bucket over said block to the hauling line; a stop on the main cable lying in the path of said carriage; and latch means adapted to hold said carriage upon its first engaging said stop and release the same by a pull on the hauling line after said first engagement, said latch means comprising a part carried by the stop and a part carried by the carriage, said parts adapted to engage and hold the carriage against return movement upon the carriage first engaging the stop, and means whereby another pull alone on the hauling line after said first engagement of the carriage with the stop will cause one of said parts to move to a stable position where it is out of engagement with the other part, and where it will not re-engage said other part when the hauling line is released following said pull.

In witness whereof, I have hereunto set my hand this 23 day of February, A. D. 1927.

JOHN W. PAGE.